United States Patent [19]

Welkey

[11] Patent Number: 4,909,548

[45] Date of Patent: Mar. 20, 1990

[54] COMPOUND-TAPER FLANGE ASSEMBLY

[75] Inventor: Joseph J. Welkey, Houston, Tex.

[73] Assignee: Bas-Tex Corporation, Houston, Tex.

[21] Appl. No.: 264,446

[22] Filed: Oct. 28, 1988

[51] Int. Cl.$^4$ ............................................. F16L 25/00
[52] U.S. Cl. ................... 285/334.2; 285/351;
 285/363; 285/917; 285/422; 285/423
[58] Field of Search ...................... 285/334.2, 917, 351,
 285/363, 422, 423

[56] References Cited

U.S. PATENT DOCUMENTS

| | | | |
|---|---|---|---|
| 1,426,724 | 8/1922 | Fyffe | 285/334.2 X |
| 1,821,863 | 9/1931 | Wilson | 285/334.2 |
| 4,629,224 | 12/1986 | Landriault et al. | 285/334 |

Primary Examiner—Dave W. Arola
Attorney, Agent, or Firm—Bernard A. Reiter; Daniel N. Lundeen

[57] ABSTRACT

A compound tapered flange assembly for sealing axially aligned flanged tubular members. Opposed annular recesses are formed in each flange. Each recess has a radial shoulder tapered with respect to a transverse plane disposed between the flanges such that the axial distance between the radial plane and the shoulder at a maximum diameter is greater than the axial distance from the plane to the shoulder at a minimum diameter. Each recess also has an inside frustoconical surface tapered with respect to the longitudinal axis with a minimum inside diameter adjacent the shoulder, and a maximum inside diameter adjacent a face of the flange. A bifrustoconical annular seal ring has outside and end surfaces complementarily tapered to engage the shoulder and the inside surface of the recesses. A primary metal-to-metal area seal is formed between the shoulder and the end of the seal ring, and a secondary metal-to-metal area seal is formed between the inside and outside surfaces of the recess and the seal ring, respectively. The inside and outside sealing surfaces are pressure and temperature assisted into tighter sealing engagement by the fluid conducted through the assembly.

12 Claims, 1 Drawing Sheet

COMPOUND-TAPER FLANGE ASSEMBLY

FIELD OF THE INVENTION

The present invention relates to flange assemblies for fluid flow conduits, and particularly to a flange assembly which has a compound taper to form metal-to-metal type sealing areas with a seal ring.

BACKGROUND OF THE INVENTION

Various flange assembly structures are known for sealing tubular members for the flow of the fluid therein. Some of these have included an annular seal ring having a bifrustoconical shape, i.e. a radially inwardly tapered sealing surface extending from a central portion of the seal ring axially toward either end thereof. Typically, such a bifrustoconical seal ring is engaged in complemenarily sealing surfaces formed in a recess in ends of opposed tubular members. In U.S. Pat. No. 4,470,609, for example, the drawing of the tubular members toward each other cams a bifrustoconical saal ring to radially compress nonmetallic soft seals supported on the bifrustoconical surfaces to form a fluid seal between the tubular members and the seal ring. The use of such non-metallic soft seals is disadvantageous in some applications because such soft seals tend to be damaged more readily by the presence of dirt or foreign material, or are more readily adversely effected by elevated pressure and temperature of the fluid in the tubular members, and can extrude from the annular rings in which they are placed.

U.S. Pat. No. 3,507,506 also discloses a bifrustoconical seal ring which seats in annular recesses formed in adjacent mating flanges of tubular members. A peripheral groove is formed near the axial end of the seal ring to provide elastic, somewhat flexible noses, which are compressed against the shoulders of the annular recesses of the flanges to provide a primary sealing surface. Deformation of the noses in this manner provides a relatively small annular area for sealing which is more like a line-type seal than an area-type seal. In addition, a soft secondary seal is used in the frustoconical surfaces of the seal ring and is compressed against the annular sealing recess of the flange. Exposure of this seal to high temperature would result in an elasticity decrease of the seal ring, which in turn could lead to a compromised primary seal. The presence of high pressure in the tubular members can result in a leak at both the primary and secondary seal surfaces in this type of seal. Furthermore, this type of seal ring is relatively difficult to manufacture since it requires the formation of peripheral grooves and frustoconical surfaces of the seal ring and tight tolerances with respect to the length of the seal ring and the annular sealing recesses in the flanges.

There is described in U.S. Pat. No. 712,047 a bifrustoconical seal ring which is wedged into frustoconically tapered sealing recesses formed in the ends of hoses, pipes or fittings. This joint employs a seal ring and annular flange recesses which have flat ends which do not function as a seal. Instead, the seal is formed by severe wedging of the seal ring into the annular recesses of the opposed flanges, i.e. the seal ring relies on radial camming on the frustoconical surfaces into engagement by tightening the flange nuts to form a seal. Such a seal is generally adversely effected by the presence of any dirt on the sealing surfaces, and such adverse effects on the seal are not readily overcome by additional tightening of the seal. It is also stated at page 2, lines 9-10, of this patent that the seal surfaceiis preferably a little rough. In addition, this seal may be adversely affected by thermal expansion by temperature changes in the fluid flowing in the tubular member or pipe because of different rates of expansion between the seal ring and the flanges.

U.S. Pat. Nos. 4,214,779 and 1,150,249 may also be relevant background to the present invention.

SUMMARY OF THE INVENTION

The present invention provides a compound-taper flange assembly which includes first and second flanged tubular members having opposed radially extending faces and means for drawing the tubular members in generally axial alignment toward a radial plane between the faces. Opposed annular recesses are formed in each flange adjacent a longitudinal bore of each tubular member. Each recess has a radial shoulder tapered with respect to the radial plane. The axial distance from the radial plane to the shoulder at a maximum diameter thereof is greater than the axial distance from the radial plane to the shoulder at a minimum diameter thereof. Each recess also has an inside surface tapered with respect to a longitudinal axis of the tubular members with a minimum inside diameter adjacent to the shoulder and a maximum inside diameter adjacent to the face. An annular seal ring has opposite longitudinal ends received in sealing engagement in the recesses. Each end of the seal ring has a radial surface complemenarily tapered to engage the shoulder of the recess and an outside surface complementarily tapered to engage the inside surface of the recess. A primary metal-to-metal area seal is formed between the shoulder of the recess and the radial surface on the end of the seal ring. A secondary metal-to-metal area seal is formed between the inside and outside surfaces of the recess and seal ring, respectively. The inside and outside surfaces are urged into tighter sealing engagement by pressure and temperature increases in any fluid in the bore in tubular members. A radially outwardly extending lip is preferably formed on the seal ring between the axial ends thereof and may desirably serve as visual indication of proper seating of the seal ring between the flanges. The seal ring and the bore in the tubular members preferably have the same inside diameter. The angle of taper of the shoulder of the recess with respect to the radial plane is preferably about the same as the angle of taper of the inside surface with respect to the longitudinal axis, and especially about 10°. The flanges and the recesses may be symmetrical about the radial plane, as may the ends of the seal ring. The minimum outside diameter of the seal ring, prior to engagement of the radial seal ring surface with the shoulder of the recess, is preferably slightly larger than the minimum diameter of the inside surface such that the seal ring is elastically radially compressed on urging of the flanges together to obtain abutment of the radially surface with the shoulder, and especially such that the radial compression corresponds to the elastic-plastic transition of the seal ring material.

DETAILED DESCRIPTION OF THE PREFERRED EMBODIMENTS

Figure 1:
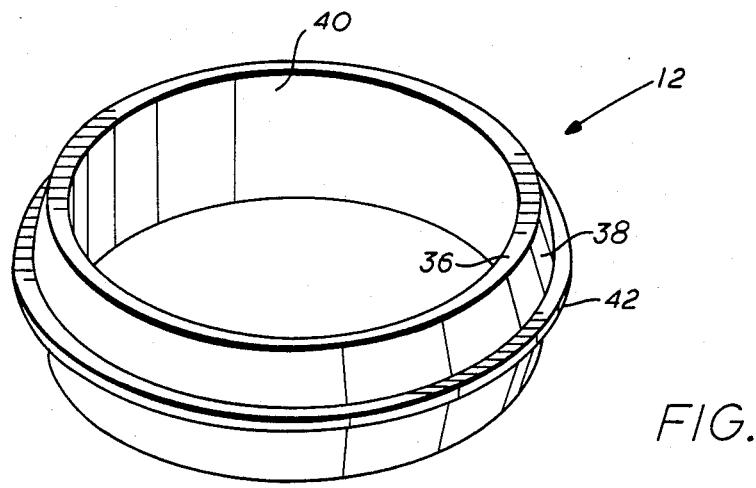
FIG. 1 is a perspective view of a seal ring employed in the assembly of the present invention.
Figure 2:
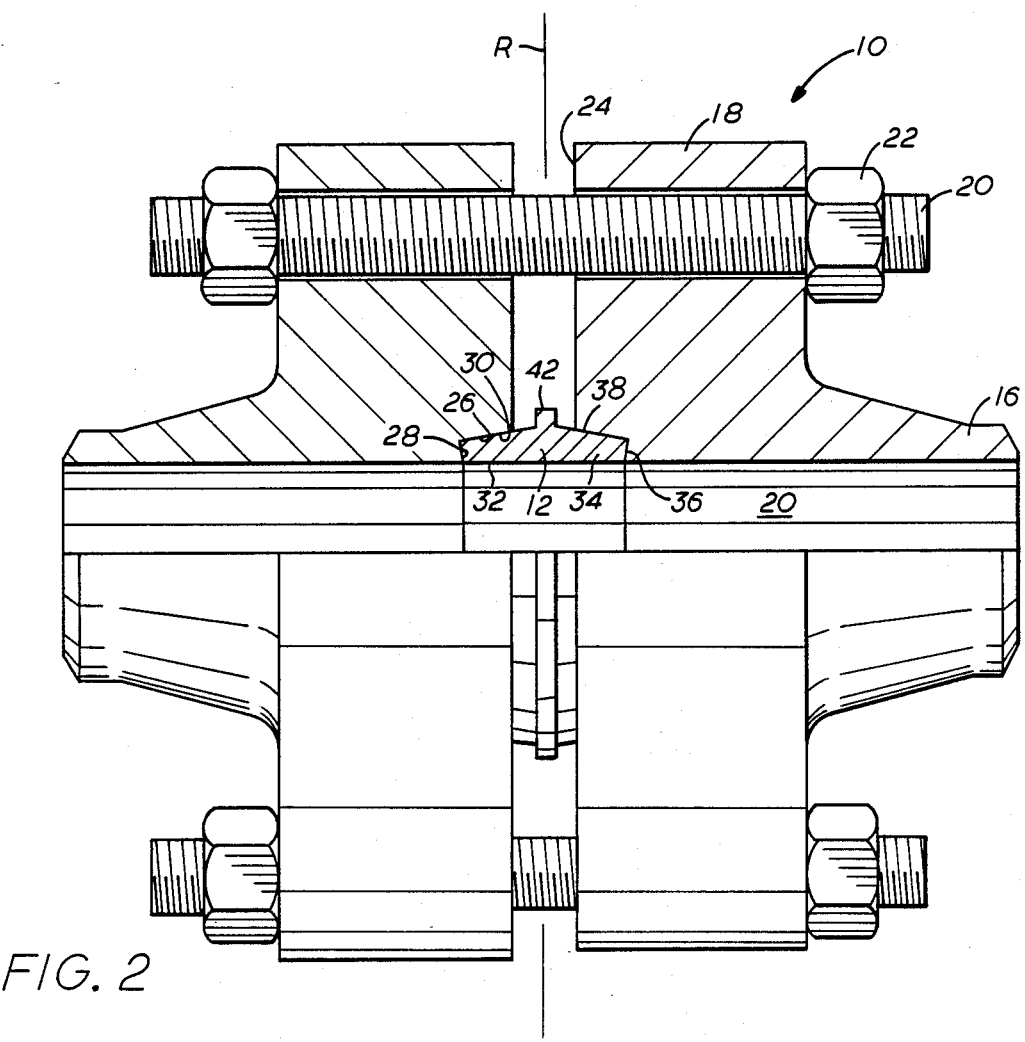
FIG. 2 is a quarter section view of a flange assembly including the seal ring of FIG. 1.

Referring now to FIGS. 1 and 2 n which like reference numerals refer to like parts, the assembly 10 includes seal ring 12, first tubular member 14 and second tubular member 16 made of a suitable material, such as, for example, steel, nickel, cast iron or other suitable material. The tubular members 14,16 are generally symmetrical with respect to radial plane R disposed therebetween. Each is provided with a flange 18 extending radially from a central bore 20. The flanges 18 are drawn towards each other by, for example, conventional bolts 20 and nuts 22 which are threadedly engaged.

The flanges 18 have opposed radial faces 24 which extend outwardly from central bore 20. The seal ring 12 is disposed in recesses 26 formed in each respective tubular member 14,16. Each recess 26 includes radial shoulder 28 and inside frustoconical surface 30. The shoulder 28 is obliquely tapered with respect to the plane R such that the axial distance from the plane R to the shoulder at a maximum diameter thereof is greater than the axial distance from the plane R to the shoulder 28 at a minimum diameter thereof. In other words, the shoulder 28 of the tubular member 14 is tapered to form a frustoconioal surface having a vertex along a longitudinal axis of the central bore 20 spaced away from the shoulder 28 toward the opposed tubular member 16. The shoulder 28 is preferably adjacent the central bore 20, and especially has a minimum diameter at a wall thereof.

The inside surface 30 of the recess 26 is tapered obliquely with respect to the longitudinal axis of the central bore 20 with a minimum inside diameter adjacent the shoulder 28 and a maximum inside diameter adjacent the face 24. In other words, the surface 30 of the tubular member 14, for example, is tapered to form a frustoconical surface with a vertex along the longitudinal axis of the central bore 20 disposed away from the opposed tubular member 16. The angle of taper of the surface 30 is preferably 20 degrees or less with respect to the longitudinal axis, more preferably 5 to 15 degrees with respect thereto, and esecially about 10 degrees. The angle of taper of the shoulder 28 with respect to the radial plane R is similarly preferably about 20 degrees or less, more preferably 5 to 15 degrees with respect thereto, and especially about 10 degrees. Preferably, the angle of taper of the shoulder 28 with respect to the radial plane R is about the same as the angle of taper of the surface 30 with respect to the longitudinal axis of the central bore 20.

The seal ring 12 has opposed longitudinal ends 32,34 which are received in the recess 26 of the tubular members 14,16, respectively. Each end 32,34 of the seal ring 12 has a radial surface 36 complementarily tapered to engage the shoulder 28 and an outside surface 38 complementarily tapered to engage the inside surface 30. It is preferred that the seal ring 12 include an inside surface 40 having a diameter equivalent to that of the central bore 20, or within reasonable manufacturing tolerances thereof. A peripheral lip 42 is also preferably formed around an outermost edge of the seal ring 12 between the surfaces 38 of either longitudinal end 32,34 of the seal ring 12.

In operation, a primary metal-to-metal area seal is formed between the shoulder 28 of the recess 26 and the radial surface 36 of the seal ring 12. A secondary metal-to-metal seal is formed between the inside surface 30 of the recess 26 and the complementarily engaged outside surface 38 of the seal ring 12. The seal ring 12 is placed in the assembly in the recess 26 of each respective tubular member 14,16 and the primary and secondary seals are formed by drawing the flanges 24 toward each other by means of the nuts 2 and the bolts 20. There is a slight radial camming of the seal ring 12 by the abutment of the surface 30 against the surface 38 until the surface 36 of the seal ring 12 engages the shoulder 28 of the recess 26. The initial camming of the seal ring in this manner is not usually generally sufficient with the oblique tapers involved to form a reliable, primary seal therebetween. However, further tightening of the nuts 22 and the bolts 20 results in axial compression of the surface 36 against the shoulder 28 to form the primary seal. This is facilitated by the employment of end surfaces having a discrete and not insubstantial radial dimension so that the entire area of contact between the end surface 36 and the shoulder 28 results in the formation of an area-type seal, rather than a line-type seal as is normally the case when conventional O-rings or gaskets are employed.

The secondary seal between the surface 30 of the recess 26 and the surface 38 of the seal ring 12 serves as a back up in the event of any leakage or failure of the primary seal area. The secondary seal is especially important when the assembly 10 is used in a service which might cause expansion of the tubular members 14, 16 and the seal ring 12 employed therein. Such expansion could be caused, for example, by conducting a fluid through the central bore 20 at elevated temperature and/or pressure. The presence of a high temperature and/or pressure fluid in the central bore 20 may result in the impairment or loss of the integrity of the primary area seal, but in turn will result in an increased amount of radial compression of the seal ring at the outside surface 38 adjacent the inside surface 30 of the recess 26. Thus, the secondary area seal is pressure- and/or temperature-assisted to enhance the reliability of the overall seal.

In designing the dimensions of the seal ring 12 and the recesses 26, it is important that there should be a slight offset between the radial surface 36 and the shoulder 28 when the outside surface 38 of the seal ring 12 initially abuts the inside surface 30 of the recess 26 during installation. This slight offset is usually only great enough that upon abutment of the radial surface 36 of the seal ring 12 against the shoulder 28 of the recess 26 the seal ring will be cammed into the recess 26 no more than hand or finger tight. Optimum results are obtained when the seal ring 12 dimensions are such that at the design pressure and temperature, the radial compression of the seal ring 12 by the abutment of the surfaces 30, 38 will be such that the seal ring 12 is at the maximum elastic limit for compression. The design of the seal ring 12 in the assembly 10 should be done carefully such that there is no plastic deformation of the seal ring 12 within the design limits of the assembly 10. It is readily appreciated that any plastic deformation of the seal ring 12 might result in a loss of integrity of the seal upon cooling and/or reduction in pressure of the fluid in the central bore 20. All of the sealing surfaces are preferably smooth.

The design of the seal is best illustrated by means of an exemplary calculation. Assuming that the seal ring has the behavior of a circular wire rod or hoop, the deformation ($\delta$) of the seal ring has the following relationship:

$$\delta = \frac{F\pi D}{AE};$$

wherein F is the axial force, D is the diameter, A is the cross-sectional area in a radial plane, and E is the modulus of elasticity of the seal ring material. Since it is also known that $F=SA$, wherein S is the stress, it follows that the deformation has the following relationship:

$$\delta = \frac{S\pi D}{E}.$$

It is also known that the deformation has the additional relationship:

$$\delta = \pi L \tan \theta$$

wherein L is the axial displacement or offset between the end 36 of the seal ring 12 and shoulder 28 of the recess 26 at the initial contact of the frustoconical surfaces 26 and 38, i.e. in the initial unseated or hand tight condition, and $\theta$ is the angle of the secondary seal area of the seal ring, surface 38, with respect to the longitudinal axis. Therefore, both of these relationships are satisfied in the following equation:

$$L = \frac{SD\pi}{E\tan\theta}$$

In the case of a 4-inch carbon steel seal ring when $\theta$ is 20°, the yield stress ($S_y$) is 36,000 psi, the modulus is $29 \times 10^6$ psi, and the offset necessary to reach the yield stress in the seated position is 0.014 in. In practice, the manufacturing tolerance, e.g. 0.003 in., is added to the calculated offset to ensure that the yield stress is obtained in the seal ring in the seated position.

It has been found that the use of the seal ring 12 in the assembly 10 as described hereinabove has several advantageous results. The metal-to-metal seals employed are not as easily adversely effected by the presence of dirt or foreign material in the sealing area, and in most instances, any such adverse effect on the integrity of the seal can be overcome by merely further tightening of the flanges. Since soft seals are avoided in the seal of the present invention, extrusion thereof at high temperature and/or pressure is avoided. In addition, since no annular grooves or channels are formed in any of the sealing surfaces, manufacture of the seal ring and the tubular members in which it is employed is simplified. Moreover, since the seal ring 12 is not tightly wedged or cammed into place by the engagement of the respective frustoconical surfaces, the seal ring is more readily removed during disassembly of the connection or inspection and/or service. A very significant advantage is that the seal of the present invention may be employed at relatively high temperatures and pressures. It has been found that with proper design of the seal ring and the flanges that a fluid-tight seal can be maintained at extreme pressures and/or temperatures of the fluid contained thereby, for example, 20,000 psi or more, and 1500° F. or more.

The foregoing description of the invention is illustrative and explanatory thereof. Various modifications in the size, material and geometry of the various components employed will occur to those skilled in the art in view of this disclosure. For example, while the invention is described above in reference to metallic components, it is contemplated that it is also applicable to non-metallic joints formed of, for example, fiberglass pipe and polytetrafluoroethylene seal rings. It is intended that all such variations within the scope and spirit of the appendedcclaims be embraced thereby.

What is claimed is:

1. A compound taper flange assembly, comprising:
   first and second flanged tubular members each having a longitudinal bore and opposed radially extending faces;
   means for drawing the tubular members in general axial alignment toward a radial plane between said faces;
   opposed annular recesses formed in each flange adjacent a longitudinal bore of each tubular member, each recess having a radial shoulder tapered with respect to said radial plane wherein the axial distance from said radial plane to said shoulder at a maximum diameter thereof is greater than the axial distance from said radial plane to said shoulder at a minimum diameter thereof, each recess having an inside surface tapered with respect to a longitudinal axis of said tubular members with a minimum inside diameter adjacent said shoulder and a maximum inside diameter adjacent said face;
   an annular seal ring having opposite longitudinal ends received in sealing engagement in said recesses, wherein each end has a radial surface complementarily tapered to engage said shoulder and an outside surface complementarily tapered to engage said inside surface, wherein a primary area seal is formed between said shoulder and said radial surface and a secondary area seal is formed between said inside and outside surfaces, said inside and outside surfaces being urged into tighter sealing engagement by pressure and temperature increases in any fluid in said bore in said tubular members.

2. The assembly of claim 1, wherein a radially outwardly extending lip is formed on said seal ring between said ends.

3. The assembly of claim 1, wherein the seal ring and the bore have the same inside diameter.

4. The assembly of claim 1, wherein the angle of taper of the shoulder with respect to the radial plane is about the same as the angle of taper of the inside surface with respect to the longitudinal axis.

5. The assembly of claim 1, wherein the angle of taper of the shoulder with respect to the radial plane is about 10°.

6. The assembly of claim 1 wherein the angle of taper of the inside surface with respect to the longitudinal axis is about 10°.

7. The assembly of claim 1, wherein the flanges and the recesses are symmetrical about the radial plane.

8. The assembly of claim 1 wherein the ends of the seal ring are symmetrical with respect to the radial plane.

9. The assembly of claim 1 wherein the minimum outside diameter of the seal ring, prior to engagement of the radial seal ring surface with the shoulder, is slightly larger than the minimum diameter of the inside surface such that the seal ring is elastically radially compressed upon urging of the flanges together to obtain abutment of the radial surface with the shoulder.

10. The assembly of claim 1 wherein the seal ring is elastically radially compressed in the recess by the engagement of the inside and outside surfaces.

11. The assembly of claim 1, wherein said longitudinal ends of said seal ring are offset from said radial shoulders upon initial engagement of said recess inside surfaces with said seal ring outside surface.

12. The assembly of claim 11, wherein said offset approximates the formula:

$$L = \frac{S_y D}{E \tan\theta} + \epsilon$$

wherein L is the offset, $S_y$ is the yield stress of the seal ring material, D is the diameter of the seal ring, E is the modulus of elasticity of the seal ring material $\theta$ is the angle of taper of the seal ring outside surface and $\epsilon$ is the absolute value of the manufacturing tolerance of the length of the seal ring.

* * * * *